United States Patent

[11] 3,552,300

| [72] | Inventors | Joseph Matzke<br>4701 Park Ave., Minneapolis, Minn. 55415;<br>Gary R. Zempel, 5156 Danens Drive, Edina, Minn. 55435 |
|---|---|---|
| [21] | Appl. No. | 691,570 |
| [22] | Filed | Dec. 18, 1967 |
| [45] | Patented | Jan. 5, 1971 |

[54] APPARATUS FOR PROOFING AND FRYING BAKERY GOODS
10 Claims, 10 Drawing Figs.

[52] U.S. Cl. .................................................. 99/352, 99/405, 99/407
[51] Int. Cl. ...................................................... A47j 37/12
[50] Field of Search ........................................... 107/7, 7.6, 4, 4.4, 14.8, 57.3; 118/17, 70; 99/352, 353, 354, 404, 405

[56] References Cited
UNITED STATES PATENTS

| 1,821,689 | 9/1931 | Broeg | 107/4 |
| 2,335,722 | 11/1943 | Adams | 118/70X |
| 3,044,442 | 7/1962 | Pott | 118/70X |
| 2,709,955 | 6/1955 | Hunter | 99/404 |
| 2,897,772 | 8/1959 | Hunter | 99/352 |
| 3,316,833 | 5/1967 | Williams et al. | 99/404 |

Primary Examiner—Laverne D. Geiger
Assistant Examiner—Robert I. Smith
Attorney—Ronald E. Lund and James V. Harmon ABSTRACT: An apparatus for proofing and frying bakery goods including a frying vessel containing a heated oil and a proofing cabinet adjacent to the inlet of the vessel with a single endless chain conveyor running through both the proofing cabinet and the frying vessel for transporting yeast-leavened bakery goods directly from the cabinet into the frying vessel. Trays on the conveyor support bakery goods. A holddown conveyor mounted above the fryer is provided with covers which enclose bakery goods while submerged to limit their expansion.

PATENTED JAN 5 1971
3,552,300
SHEET 1 OF 4
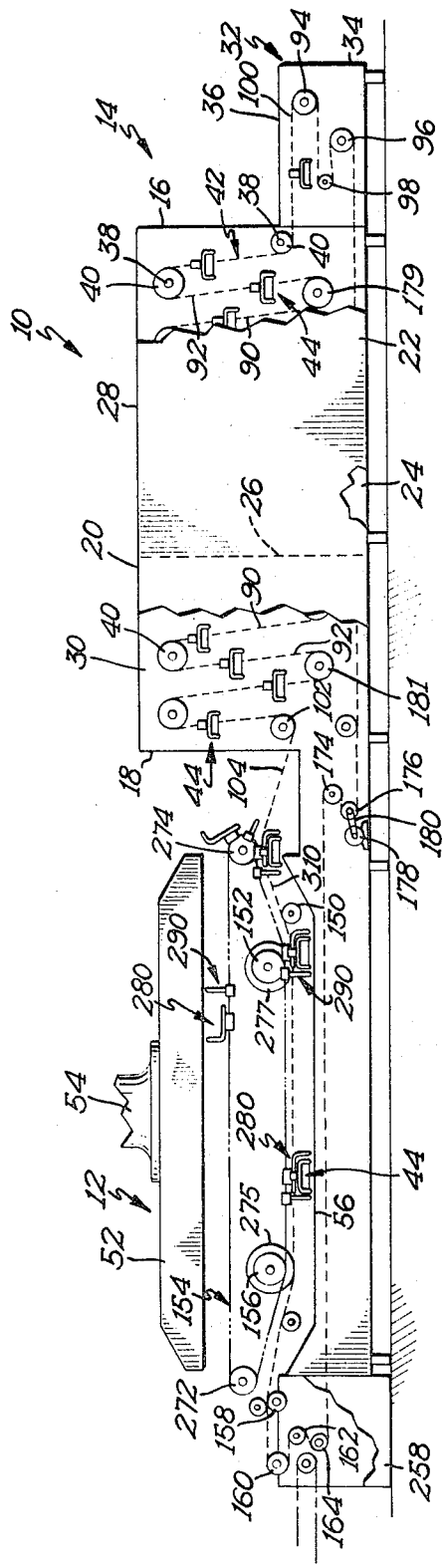
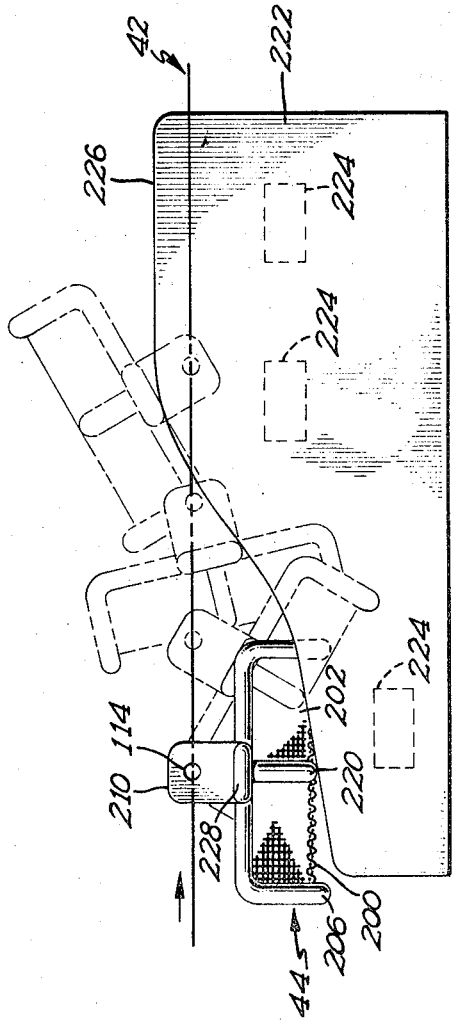
INVENTORS
JOSEPH MATZKE,
GARY R. ZEMPEL
BY
*James V Harmon*
ATTORNEY

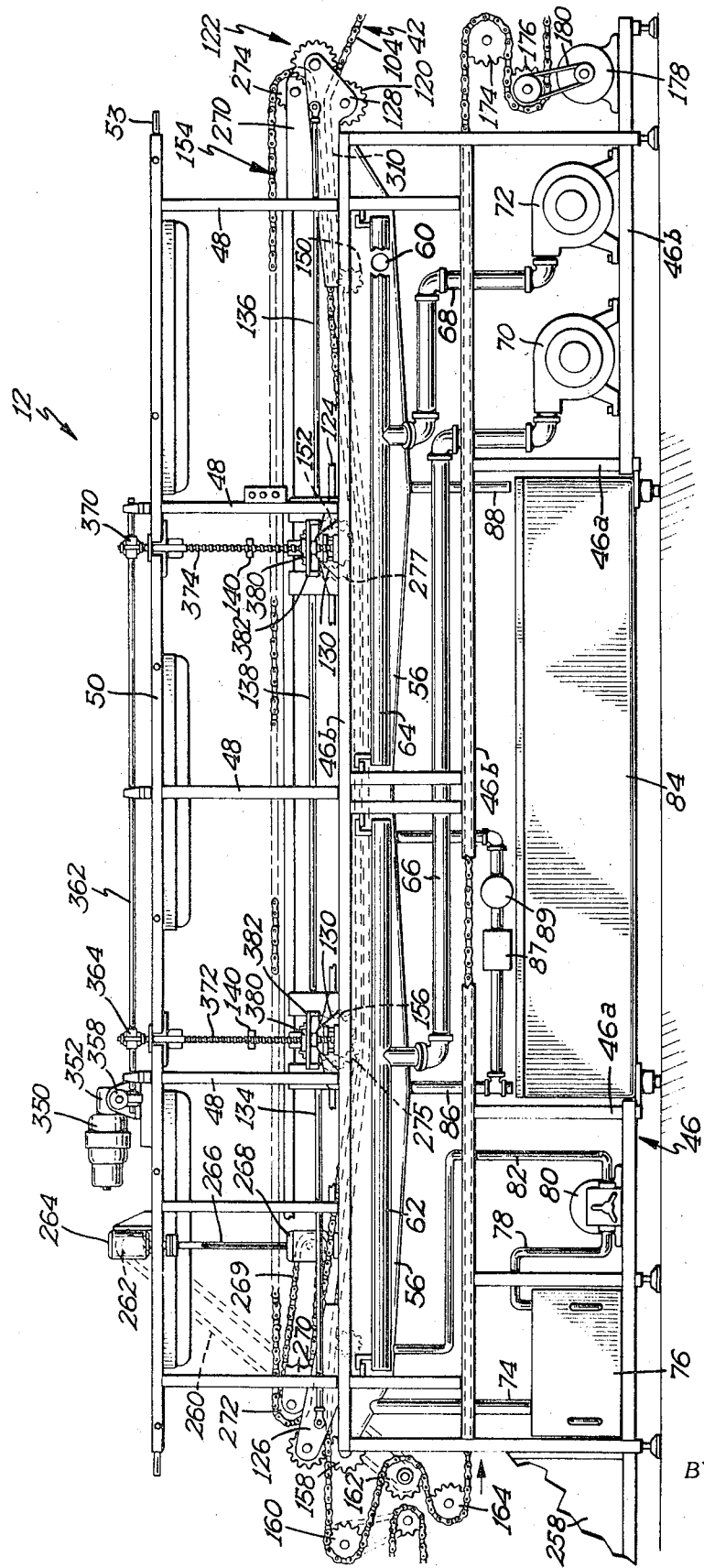

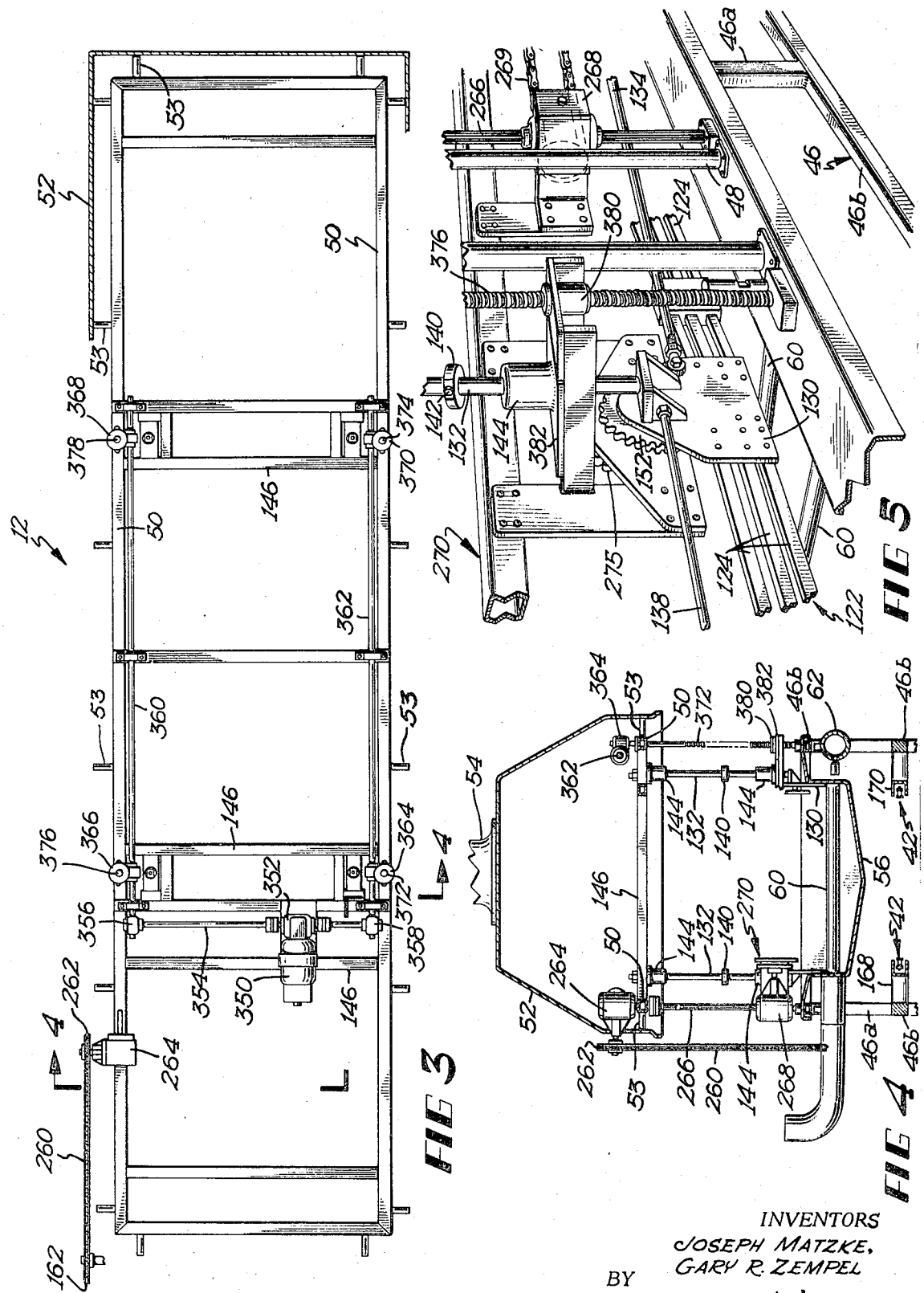

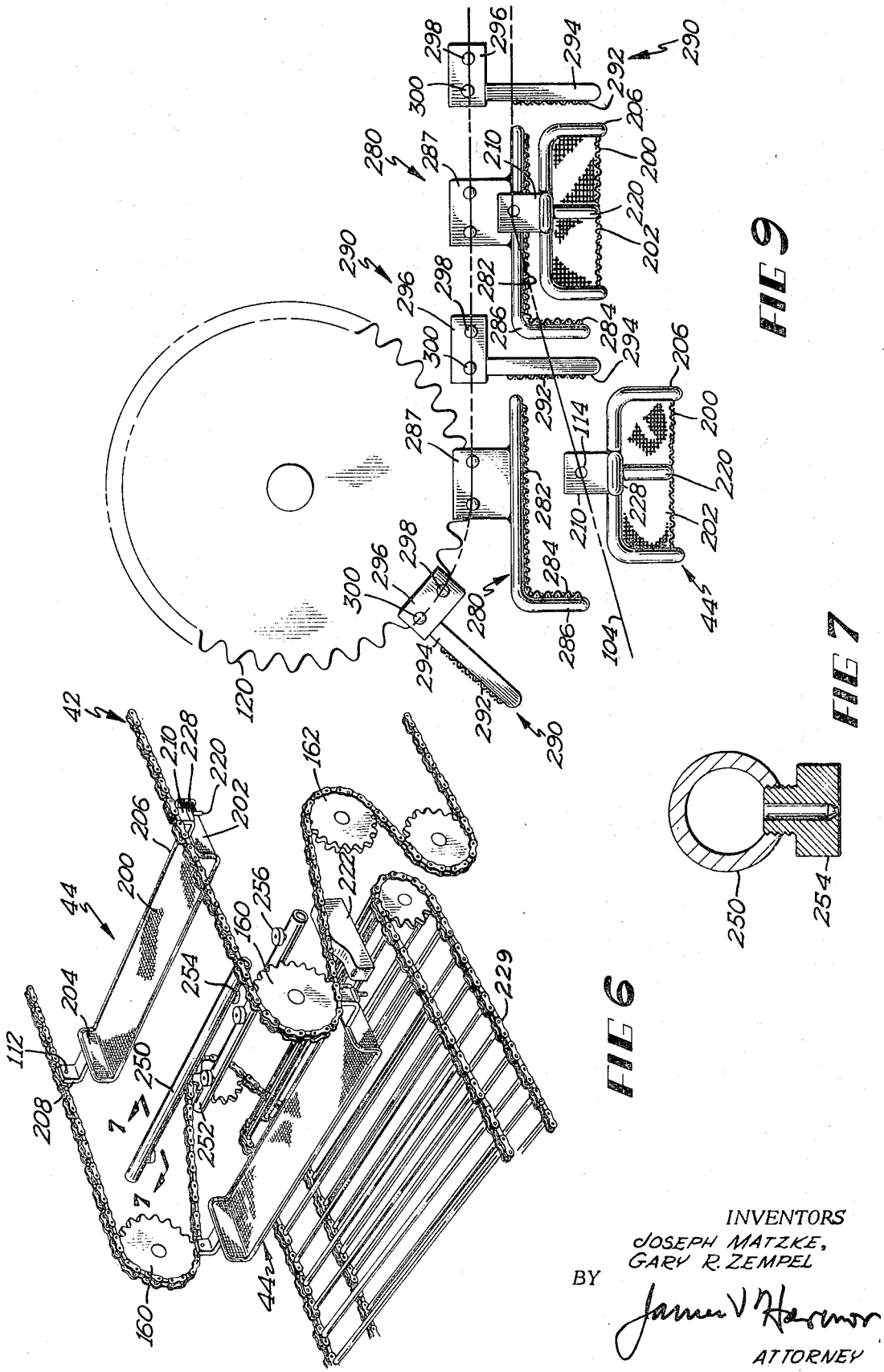

APPARATUS FOR PROOFING AND FRYING BAKERY GOODS

The present invention relates to equipment for preparing bakery goods and more particularly to an apparatus for proofing and continuously transporting yeast-leavened bakery goods from the proofing zone to a frying vessel.

Prior devices for proofing and frying pastry products such as doughnuts, bismarks and glazed buns have required a complicated transfer mechanism for removing the products from a conveyor employed for transporting them through the proofer to a second conveyor employed for transferring them through the fryer. Not only is the mechanism complicated, but in addition there is a tendency for the product to be damaged or for its volume to decrease during the transfer process.

It will be understood that in making such a transfer the proofed goods are frequently subjected to either shock or vibration or both. Damage of this kind has been found to be a prime cause for the loss of leavening gas from the proofed goods.

Prior devices of the type described have also been difficult to clean effectively. This condition can, of course, lead to the growth of bacteria and contamination of the product that is being processed. Much of the equipment previously available was difficult to clean and service primarily because the conveyor mechanism employed for transferring the product through the frying vessel was positioned in a fixed location and could be removed only with great difficulty and inconvenience. As a result, when the conveyor mechanism was to be cleaned, the cooking oil had to be completely removed from the cooking vessel or in the alternative the apparatus partially dismantled to facilitate the removal of the conveyor. A further shortcoming of the prior devices of the type described is the lack of uniformity in the finished product due to differences in handling of the individual pieces as they are transferred from one operating station to the next.

A further shortcoming was the difference in size of the finished pieces. This disadvantage is particularly important where the finished goods must be packaged at high speed with automatic equipment.

In view of these and other deficiencies of the prior art, it is one object of the prior invention to provide an improved proofing and frying apparatus in which the bakery goods are continuously and automatically transferred from the proofing station to a frying station and are transported continuously through the frying station.

A further object of the present invention is the provision of an improved proofing and frying apparatus for bakery goods with a provision for continuously transferring the bakery goods from the proofer to the fryer and for totally enclosing the bakery goods just prior to being submerged in the frying medium.

A further object of the invention is the provision of an improved apparatus of the type described wherein submerging and enclosing baskets are provided to securely hold the bakery goods as they pass through the frying medium with certain portions of the basket being movable with relation to the other portions for the purpose of releasing the fried bakery goods from the baskets.

Another object of the invention is the provision of an improved proofing and frying apparatus including a primary conveyor and a submerging conveyor with the provision for either simultaneously or separately removing the conveyors from the frying medium without interrupting synchronous moving of the conveyors or interfering with the movement of the primary conveyor through the fryer.

A further object of the invention is the provision of a continuous proofing and frying apparatus wherein the mode of transferring of bakery goods from the proofing station to the frying vessel is effective in increasing product uniformity, helping to control product size and eliminating the requirement for either manual or separate automated transferring mechanisms.

A still further object of the invention is the provision of an improved apparatus of the type described wherein a loss of leavening gas from the proofed products prior to their transfer to the frying vessel is minimized.

These and other more detailed and specific objects will become apparent in view of the following specification and drawings, wherein:

FIG. 1 is a semidiagrammatic side elevational view of an apparatus embodying the invention.

FIG. 2 is a side elevational view of the fryer portion of the apparatus of FIG. 1 on an enlarged scale.

FIG. 3 is a plan view of the fryer.

FIG. 4 is a transverse vertical sectional view taken on line 4-4 of FIG. 3.

FIG. 5 is a partial perspective view of the side of the fryer showing a portion of the conveyor elevating mechanism.

FIG. 6 is a semidiagrammatic partial perspective view of the mechanism employed for transferring the products from the frying conveyor to a finished-goods conveyor.

FIG. 7 is a transverse sectional view taken on line 7-7 of FIG. 6 on a greatly enlarged scale.

FIG. 8 is a semidiagrammatic side elevational view of the product support basket inverter showing the basket in several positions taken as it is inverted.

FIG. 9 is a partial side elevational view of the product supporting basket as they move toward one another to the closed position.

FIG. 10 is a partial side elevational view of a portion of the conveying apparatus with the baskets in a totally closed position.

Refer now to FIG. 1 which shows an apparatus which is composed of two major parts, a dual zone proof chamber 10 and a fryer 12.

The proofer is composed of a housing 14 including front and rear walls 16 and 18, a top wall 20, sidewalls 22 and 24 and a vertically disposed laterally extending partition 26 which divides the proofing chamber 10 into low and high temperature zones 28 and 30. At the right end of the proofing apparatus as seen in the FIG. is a feed-in station 32 including sidewalls 34. The feed-in station 32 is open at the top 36 so that the food products that are to be proofed can be placed on the endless conveyor which will be described below. Within the proofing chamber 10 are provided a plurality of longitudinally and vertically distributed transversely extending shafts 38, provided on each end with laterally spaced chain sprockets 40. Entrained over the sprockets 40 is an endless conveyor 42 composed of laterally spaced parallel endless conveyor chains upon which are supported transversely extending and longitudinally spaced apart product-supporting baskets 44.

The general construction of the frying apparatus will now be described in connection with FIGS. 1 and 2. The fryer 12 is composed of a supporting framework 46 of any suitable construction including vertically disposed supporting posts 46a and horizontally disposed beams 46b. Extending vertically from the uppermost of the horizontally disposed beams 46b are a plurality of longitudinally spaced laterally extending canopy-supporting legs 48. Longitudinally extending headers 50 are mounted upon their upward ends. A canopy or exhaust hood 52 of a suitable construction (FIG. 1) is secured to the headers 50 by means of laterally extending supports 53. During operation the fumes generated by cooking are removed through a duct 54 communicating with the canopy 52.

The fryer 12 includes the usual cooking vessel 56 which is supported along its sides and at its ends upon the longitudinally extending beams 46b. During operation the liquid-cooking medium which will ordinarily consist of a solid or liquid vegetable shortening is maintained at the required temperature by the provision of laterally extending heating pipes 60 which communicate at their ends to manifolds 62 and 64. The manifolds in turn communicate through ducts 66 and 68 with blowers 70 and 72, respectively, which supply a mixture of gas and air to the pipes 60 where it is burned at a controlled rate to maintain the temperature of the cooking liquid at a predetermined level.

As shown in FIG. 2, a drain line 74 is connected to the cooking vessel 56. The cooking liquid is normally drained continuously through the line 74 to a holding tank 76. The cooking medium is withdrawn from the holding tank 76 through a duct 78 to a continuously operated positive displacement pump 80 which transfers the filtered oil back to the cooking vessel through a return line 82.

Mounted on rollers at the center of the supporting framework 46 is a removable oil holding tank 84 from which oil is drained through lines 86 and 88. A filter 87 of a conventional known construction such as a paper media filter is connected to line 86. The filtered shortening is returned by means of a pump 89 to the vessel 56.

The construction of the main chain conveyor 42 will now be described with particular reference to FIGS. 1, 2, 6, 9 and 10. As mentioned briefly in connection with FIG. 1 the portion of the main conveyor 42 within the proofing apparatus 10 is entrained over vertically and longitudinally spaced pairs of sprockets 40, each mounted on a horizontally disposed laterally extending shaft 38. It will be understood that throughout the application the conveyor 42 is supported by laterally aligned pairs of sprockets each mounted upon a common axle suitably supported for rotation at its ends. For convenience each pair of sprockets and axle upon which they are mounted will be referred to simply as a sprocket assembly.

As seen in the FIG., the conveyor chains are entrained alternately over upper and lower sets of sprockets to provide upwardly and downwardly moving parallel conveyor sections designated 90 and 92. The portion of the chain conveyor 42 within the feed-in station 32 is entrained over three longitudinally and vertically spaced sets of axle and sprocket assemblies designated 94, 96 and 98. In operation, a portion of the chain conveyor 42 travelling back to the feed-in station 32 through the lower part of the proofing apparatus 10 passes first over the sprocket assembly 96, next over the sprocket assembly 98 and finally over the sprocket assembly 94 to provide a horizontal section 100 that is exposed to an operator or if desired to automatic equipment (not shown) which is used for transferring the finished dough bodies to the baskets 44. The baskets 44 then travel through the proofing apparatus first through the low temperature zone 28 and then through the high temperature zone 30. They pass finally under a sprocket and axle assembly 102 (FIG. 1) which is located approximately halfway between the top and bottom of the proofing apparatus 10 and proceed from there along a slightly upwardly inclined section 104 of the conveyor. The main conveyor 42 then passes into the fryer 12.

As the conveyor 42 enters the fryer 12 it passes first over a sprocket assembly 120 (FIG. 2) which is supported upon a lower conveyor framework 122. The lower conveyor framework 122 includes longitudinally extending frame members 124 (FIG. 5) which have affixed to their ends vertically and longitudinally extending oriented sprocket supporting plates including a first pair of identical laterally disposed plates 126 and a second pair of laterally spaced identical plates 128, only one of each pair being shown. The frame members 124 have connected to them vertically disposed upwardly extending suspension plates 130. To prevent undesired downward flexure of the plates 126 and 128 hanger rods 134 and 136 are provided on each side of the framework 122 between the plates 130 and the plates 126 and 128, respectively. Between the plates 130 themselves are rods 138. It is, of course, apparent that only those on the side of the apparatus shown in FIG. 2 are visible. Identical rods are, of course, provided on the other side of the framework 122. The suspension plates 130 have vertically extending support rods 132 rigidly secured to them.

The lower conveyor supporting framework 122 normally rests upon the tops of the heating tubes 60 as best seen in FIGS. 4 and 5 but is at times elevated out of the frying vessel 56 by the provision of a stop collar 140 on each of the support rods 132. The position of each of the collars 140 can be adjusted vertically on the rod 132 by means of a locking bolt 142 as will be described below. The upper and lower ends of the rods 132 are slidably mounted within upper and lower bushings 144 which are affixed respectively to a frame member 146 welded between the longitudinally extending stringers 50 (best seen in FIG. 4) and to horizontal plates 382 (FIG. 5).

The main conveyor 42 extends between the sprocket assembly 120 and a sprocket assembly 150 thence downwardly at a predetermined angle to a pair of laterally spaced identical sprockets 152, only one of which is shown. Each of the sprockets 152 is mounted for rotation upon the plates 130 in lateral alignment. As can thus be clearly seen in FIG. 2, the section of the conveyor 42 between the sprockets 150 and the sprockets 152 as it travels downwardly converges slowly with a submerging conveyor 154 which will be described below. The conveyor 42 then extends horizontally through the liquid medium in the frying vessel 56 thence beneath a laterally spaced pair of sprockets 156, only one of which is shown in FIG. 1, thence upwardly toward a sprocket assembly 158 horizontally, next over a sprocket assembly 160, thence toward the fryer over sprocket assembly 162. The shaft at the sprocket assembly 162 is driven by conveyor 42 at a predetermined speed. It then passes over sprocket assembly 162, next over a sprocket assembly 164 and returns beneath the fryer within guides 168 and 170 (FIG. 4) secured to the beams 46b. The conveyor 42 passes next over sprocket assemblies 174 and 176. The sprocket assembly 176 is driven by means of a motor 178 which is connected to the sprocket assembly 176 by means of a drive chain 180. As seen in FIG. 1, from the sprocket assembly 176 the conveyor 42 extends through the bottom portion of a proofing apparatus 10 to the sprocket assembly 96 as described above. Synchronous load sharing drive motors are connected to sprocket assemblies 179 and 181 within the proofer 10 as well as to the sprocket assembly 176 to distribute the driving force along the length of the conveyor thereby reducing surging and eliminating high stress points.

Refer now to FIGS. 6 and 9 which illustrate the product supporting baskets 44. Each of the baskets 44 includes a bottom surface 200 and side surfaces 202 and 204 formed from a suitable pervious material such as a metal screen. In this instance the basket is constructed of a woven metal screen secured at its edges to a rod 206.

The baskets 44 are suspended from brackets 208 and 210 which are pivotally secured to pins 112 and 114 which extend centrally from the conveyor chain 42. The baskets 44 thus hang downwardly from the pins slightly below the chains of the conveyor 42 as seen in FIGS. 1 and 6. After passing over the sprocket assembly 160, the baskets pivot about the axis of the pins 112 and 114 so as to remain in an upright position. They then travel towards the sprocket assembly 162. A cam follower 220 secured to the bracket 210 then strikes a fixed cam 222 which is rigidly affixed to supporting bars 224 (FIG. 8) connected to the framework 46. The cam 222 is provided with an upwardly inclined camming surface 226 which contacts the cam follower 220 as the conveyor 42 is advanced. As the follower 220 engages the camming surface 226, the basket 44 is inverted to the dotted line position shown at the extreme right in FIG. 8. As the basket is inverted, the finished food product on the basket is dumped onto the take-away conveyor 229.

Refer now particularly to FIGS. 6 and 7 which illustrate a preferred form of conveyor-cleaning mechanism in accordance with the invention. As seen in the FIG., a pair of horizontally disposed laterally extending ducts are provided. These ducts are designated 250 and 252. Compressed air is supplied to each of the ducts at a pressure of from about 10 to 50 p.s.i. The air is expelled from each duct 250 through longitudinally distributed downwardly directed nozzles 254 and from duct 252 through upwardly facing nozzles 256. The air expelled from the nozzles strikes the baskets 44 as they pass between them. Because the cooking material is in a liquid condition, excess droplets of cooking material are removed from the conveyor. The material which is removed in this manner falls from the conveyor 44 into the receptacle 258, FIG. 1.

The submerging conveyor and associated structures will now be described with reference to FIGS. 1, 2 and 3. As shown in FIG. 2, a drive chain 260 extends upwardly from the sprocket 162 and is entrained over a sprocket 262 of a right-angle gear box 264 having a splined output shaft 266. The shaft 266 extends through a gear box 268 which is affixed to a submerging conveyor supporting framework 270 upon which are supported two transversely extending longitudinally spaced sprocket assemblies 272 and 274. The conveyor 154 passes beneath a pair of longitudinally spaced central sprocket assemblies 275 and 277 (FIGS. 1 and 2). Each of these assemblies consists of a pair of laterally spaced sprockets mounted for rotation upon a supporting shaft. The positive drive connection between conveyor 42 and conveyor 154 through chain 260, gear box 264, shaft 266 and chain 269 will maintain the conveyors in synchronization at all times regardless of their vertical position.

As shown in FIGS. 1 and 9, a plurality of laterally extending longitudinally spaced covers 280 are provided on the submerging conveyor. The covers 280 are composed of connected horizontal and vertical screen sections 282 and 284 secured along their edges to wires 286 which are affixed to a bracket 287 at each end. Both brackets are rigidly connected to the chains on either side of the submerging conveyor so that the covers 280 are not free to pivot on the chains. Spaced a short distance ahead of each cover 280 is a partition 290 composed of a screen 292 supported at its edge by a wire framework 294. The wire framework is secured by means of brackets 296 at each end. The brackets are in turn connected to the conveyor chains by a pair of pins 298 and 300. As can be clearly seen in FIG. 9, the conveyor section 104 travels toward the sprocket assembly 120. The basket will be elevated slowly to a position adjacent to the partition 290 and below the cover 280. In this way the products on the basket 200 are raised into contact or near contact with the lower surface of the cover 280 and the partition 290 in a gentle manner which is unlikely to damage them. Immediately after the cover and the basket move toward one another in this manner, the now totally enclosed goods will be transferred into the cooking liquid as seen in FIG. 1. The main conveyor 42 passes below the sprocket assembly 152; the conveyor section 310 approaches even more closely the conveyor 154. In this manner the cover is brought even closer to the basket 200 until the position shown in FIG. 10 is reached, and since the pastry products are entering the cooking oil at this point, they will be floating free within the enclosure defined by the cover, basket and partition and consequently the bakery goods will be free to move within the enclosure and therefore less subject to damage. It should also be noted that while the pastry products are submerged within the fryer they will expand as they cook. As they do so, their outward surfaces will press against the surfaces of the basket and cover and partition. It will also be seen that the partition 290 will travel over the sprocket assembly 272 at the outlet end of the fryer before the cover 280. The partition will consequently be separated from the cooked product before the cover 280 is removed. There will be consequently less tendency for the cooked product which now completely or almost completely fills the enclosed space to stick to the screen of the cover, partition or the basket. It can also be seen that after the partition 290 has been moved out of the way by its passage over the sprocket 272, the cover 280 will separate from the basket 200. The basket 200 will then pass over the sprocket assembly 160 as described above in connection with FIG. 6. The completed pastry products are then removed from the baskets by the cam 222.

Refer now to FIGS. 2 and 3 with reference to the submerging conveyor elevating mechanism. A drive motor 350 is mounted upon the top of the supporting framework 146. The drive motor 350 is connected through a speed reducer 352 to a transversely disposed drive shaft 354. The ends of the shaft 354 are in turn connected through right-angle drives 356 and 358 to shafts 360 and 362 respectively, each of which is coupled through right-angle drives 364, 366, 368 and 370 to vertically disposed elevating screws 372, 374, 376 and 378. To each of the screws is connected an identical threaded follower 380, only those on the side of the apparatus which is visible in FIG. 2 being shown, rigidly secured to a submerging conveyor support bracket 382 to which the framework 270 of the upper conveyor is rigidly fastened.

During operation, when the motor 350 is run in one direction the rotation of screws 372, 374, 376 and 378 will elevate the support bracket 382 and the framework 270 out of the cooking liquid. When run in the reverse direction, the submerging conveyor will be lowered back into the cooking liquid. When the brackets 382 strike the stops 140 which are secured to the posts 132, the portion of the lower conveyor 42 within the cooking liquid and the supporting framework 122 will also be elevated out of the cooking liquid so that it can be cleaned or repaired.

The drive arrangement for the submerging conveyor will now be described in connection with FIGS. 2, 3 and 4. As shown in FIG. 2 the chain 260 connected between sprocket 162 and a sprocket 262 runs the gearbox 264 in the same speed and direction as the sprocket 262 of the lower conveyor 42. Power is conveyed from the gearbox 264 through a splined shaft 266 to which a right-angle gearbox 268 is secured. Gear box 268 is in turn connected to the sprocket assembly 272 by means of a roller chain 269 as seen in FIGS. 2 and 5. It should be noted that the submerging conveyor 270 will be reliably driven at all times set with its speed and direction of movement synchronized with conveyor 42 thereby assuring that the covers 280 will always be in registry with the baskets 200. It should also be noted that the upper submerging conveyor and the portion of the lower conveyor within the fryer can be raised and lowered without altering relative positions of the baskets and covers as both conveyors continue to run.

It is apparent that many modifications and variations of this invention as hereinbefore set forth may be made without departing from the spirit and scope thereof. The specific embodiments described are given by way of example only and the invention is limited only by the terms of the appended claims.

We claim:

1. An apparatus for proofing and frying bakery goods, said apparatus comprising a frying vessel, said vessel including side and bottom walls defining inlet and outlet ends, a proofing cabinet, said proofing cabinet including side, top, bottom and end walls having an inlet and outlet opening, said outlet opening being positioned adjacent the inlet end of the frying vessel, a framework connected to the frying vessel for supporting the vessel, an endless pastry transporting conveyor including a first section extending through both the vessel and the proofing cabinet for transporting the pastry through the proofing cabinet and frying vessel whereby the time period during which the articles are transferred from the proofing cabinet to the frying vessel can be controlled, said conveyor including a plurality of supporting members thereon adapted to receive the bakery goods to provide continuous support for them as they travel from the proofing cabinet to the frying vessel and to prevent the bakery goods from being subjected to jarring forces when transferred from the proofing cabinet to the frying vessel, said conveyor including a second section extending between the outlet of the frying vessel and the inlet of the proofing cabinet whereby each of the supporting members on the conveyor travels from the proofing cabinet through the frying vessel and is then returned to the inlet of the proofing cabinet, a holddown conveyor positioned adjacent to and above the portion of the conveyor located in the frying vessel and being adapted to contact portions of the bakery goods as they travel through the frying vessel, a drive means for advancing adjacent parts of both conveyors at the same speed and in the same direction, a portion of the conveyor extending between the proofing cabinet and the frying vessel being inclined whereby the conveyor travels upwardly as it proceeds toward the frying vessel and the holddown conveyor includes a plurality of longitudinally spaced covers whereby the supporting members are elevated as they proceed toward the holddown conveyor to raise the bakery goods resting thereon upwardly into registration with the lower surfaces of the cover members without horizontal sliding movement between the cover and the bakery goods on the support member.

2. An apparatus for proofing and frying bakery goods, said apparatus comprising a frying vessel, said vessel including side and bottom walls defining inlet and outlet ends, a proofing cabinet, said proofing cabinet including side, top, bottom and end walls having an inlet and outlet opening, a framework connected to the frying vessel for supporting the vessel, an endless pastry transporting conveyor including a first section extending through both the vessel and the proofing cabinet for transporting the pastry through the proofing cabinet and frying vessel whereby the time period during which the articles are transferred from the proofing cabinet to the frying vessel can be controlled, said conveyor including a plurality of supporting members thereon adapted to receive the bakery goods to provide continuous support for them as they travel from the proofing cabinet to the frying vessel and to prevent the bakery goods from being subjected to jarring forces when transferred from the proofing cabinet to the frying vessel, said conveyor including a second section extending between the outlet of the frying vessel and the inlet of the proofing cabinet whereby each of the supporting members on the conveyor travels from the proofing cabinet through the frying vessel and is then returned to the inlet of the proofing cabinet, a holddown conveyor positioned adjacent to and above the portion of the conveyor located in the frying vessel, said holddown conveyor including longitudinally spaced confining means comprising covers and partitions which cooperate with the supporting members to enclose the bakery goods placed on the supporting members before said bakery goods enter the frying vessel and to retain said bakery goods in an enclosed condition while in the frying vessel, the covers, partitions and supporting members restricting the expansion of the bakery goods as the same are cooked in the vessel, and a drive means for advancing adjacent parts of both conveyors at the same speed and in the same direction.

3. An apparatus for frying bakery goods of the type which are immersed in a heated frying liquid, said apparatus comprising in combination a frying vessel having sidewalls and a bottom wall, said frying vessel being open at the top thereof, the supporting framework connected to the vessel or for supporting it, a first conveyor means operatively associated with the vessel, said first conveyor means including a lower support element adapted to hold the bakery goods as they travel through the frying liquid in the vessel and a second conveyor positioned above the part of the first conveyor in the vessel, said second conveyor including a cover portion adapted to engage the upper portion of the pastry products positioned on the support for at least partially enclosing the bakery goods and limiting their expansion whereby at least some of the dimensions of the bakery goods will be held to predetermined limits, and a drive means operatively associated between the first conveyor and the second conveyor for running said conveyors at the same speed and in the same direction.

4. The apparatus according to claim 3 wherein the cover includes a horizontally disposed portion adapted to engage the top surface of the bakery goods positioned on the support element of the lower conveyor and a vertically disposed wall portion connected to one edge of the horizontally disposed portion to engage one side of the pastry products to thereby limit the expansion toward said one side.

5. The apparatus according to claim 3 wherein said upper conveyor comprises an endless connected conveyor entrained over a plurality of pairs of laterally extending longitudinally spaced horizontally disposed rotatable elements, a partition member connected to the upper conveyor adjacent to the cover and longitudinally spaced from the cover portion of the conveyor whereby the movement of the upper conveyor around the rotatably mounted support element will cause the front of the partition element to swing away from the adjacent side of the bakery goods positioned on the support to release the pastry article whereby the pastry article can be removed from the cover without damage to its side surfaces.

6. The apparatus according to claim 5 wherein the cover includes a horizontally disposed section comprising a screen element, a downwardly depending element connected to one edge of the horizontally disposed section, said downwardly depending element comprising a screen element adapted to engage the bakery goods on one side edge thereof to limit its lateral expansion and the partition member being positioned to engage the edge of the pastry product opposite said one edge whereby expansion of the pastry product will be limited.

7. An apparatus for frying pastry products comprising in combination a frying vessel including sidewalls and a bottom wall, a framework connected to the vessel for supporting the vessel, an endless conveyor operatively associated with the vessel including a portion positioned to travel through the vessel to convey the pastry products from one end of the vessel to the other, a second endless conveyor mounted above the first conveyor including pastry-engaging members for contacting the upper surfaces of the pastry articles as they travel through the cooking liquid in the frying vessel, a drive means operatively connected to the first conveyor for driving the first conveyor at a predetermined speed and direction, a power transmission means operatively connected between the drive means and the second conveyor, said power transmission comprising a drive element extending upwardly from the first conveyor, a means connected between the drive element and the second conveyor, guides for supporting the upper conveyor for movement along a vertical axis whereby the second conveyor can be raised and lowered along said vertical axis while being continuously driven at the same speed and in the same direction as the first conveyor.

8. The apparatus according to claim 7 wherein a lifting means is operatively associated with the second conveyor, said lifting means including a drive motor and members operatively associated between the framework and the second conveyor whereby the operation of the lifting drive means is adapted to raise and lower the second conveyor.

9. The apparatus according to claim 7 wherein the portion of the first conveyor within the frying vessel is mounted for up and down movement, members are operatively associated between the lifting means and the portion of the first conveyor within the frying means for raising the portion of the first conveyor in the frying means out of the frying vessel when the second conveyor is elevated upwardly to a predetermined upper elevation whereby continued upward movement of the second conveyor beyond said upper elevation will cause the portion of the first conveyor within the vessel to travel upwardly with the second conveyor until the portion of the first conveyor within the frying vessel is completely removed therefrom.

10. An apparatus according to claim 8 wherein said second conveyor is mounted for up and down sliding movement between raised and lowered positions and the portion of the first conveyor positioned in the frying vessel also is mounted for vertical sliding movement whereby it can be moved from its normal location within the vessel to an upper position out of the frying vessel for cleaning.